US006596063B2

(12) United States Patent
Rettenbacher et al.

(10) Patent No.: US 6,596,063 B2
(45) Date of Patent: Jul. 22, 2003

(54) IMPREGNATED WOOD

(76) Inventors: Markus Rettenbacher, Unterthurnstrasse 138, A-5412 Puch (AT); Norbert Mundigler, Hötzendorfgasse 3, A-3423 St. Andrä (AT)

( * ) Notice: Subject to any disclaimer, the term of this patent is extended or adjusted under 35 U.S.C. 154(b) by 0 days.

(21) Appl. No.: 09/860,726

(22) Filed: May 18, 2001

(65) Prior Publication Data

US 2002/0189491 A1 Dec. 19, 2002

(51) Int. Cl.[7] ............................ A01N 27/00; B27K 3/08

(52) U.S. Cl. ........................ 106/16; 106/15.05; 106/17; 427/297; 427/298; 427/351; 427/369; 427/397; 427/441; 428/537.1; 428/541; 514/781; 514/762

(58) Field of Search ................................ 106/15.05, 16, 106/17; 427/297, 298, 351, 369, 397, 441; 428/537.1, 541; 514/781, 762

(56) References Cited

U.S. PATENT DOCUMENTS 3,661,633 A * 5/1972 Moren ........................ 428/541
5,098,472 A * 3/1992 Watkins et al. ........ 106/123.12

FOREIGN PATENT DOCUMENTS

EP 891244 * 1/1999

* cited by examiner

*Primary Examiner*—Anthony J. Green

(57) ABSTRACT

The invention relates to the impregnation of wood by a solvent-free melt of modified natural resin which is solid at ambient temperature. Besides the modified natural resin, melts according to the invention may comprise wax and further additives. The melting point of the wax is preferably above 80° C. The addition of wax elevates the softening point and reduces the viscosity of the melt. Melts according to the invention do not tend to discolor even at the given temperatures of the loading treatment so that the wood treated with a melt of modified natural resin mainly retains its natural appearance.

17 Claims, 1 Drawing Sheet

IMPREGNATED WOOD

TECHNICAL FIELD

The invention relates to wood impregnated with a resin, to a method for impregnating and preserving wood and to an impregnating composition.

BACKGROUND OF THE INVENTION

It has been known to impregnate wood by applying oils, resins and waxes dissolved or emulgated in solvents onto the wood, whereas the solvents are removed thereafter. Such methods may be carried out at ambient or moderate temperature which largely prevents alterations of the impregnating agents. But the solvents have to be removed after the treatment, which is inefficient and raises disposal problems. Moreover, statutory provisions limit the application of such impregnation methods.

EP 891 244 B1 describes the impregnation of wood parts with a solvent-free melt of a natural resin, a wax or a mixture thereof by immersing the wood into the melt and treating the wood at elevated temperature, optionally at an excess pressure, for some time. It was observed that applying natural resins in this process at suitable temperatures and, in particular, during continuos or cyclic operation resulted in a not controllable discoloration of the melted natural resin which color even turned into black. Also the application of antioxidants or an inert gaseous atmosphere did not sufficiently prevent the discoloration, because most of the antioxidants are instable at the required process temperatures, are exhausted rapidly and, therefore, cannot efficiently be employed. Further the application of inert gases is counteracted by the oxygen which is introduced into the process by the porous wood in any case.

Because of the autocatalytic oxidation of natural resins or natural resin acids respectively, which starts at ambient temperature and intensifies with increasing temperature, the melt of natural resins becomes rapidly unsightly due to the discoloration from brown to black. This deters the application of natural resins for impregnating decorative or visible pieces and parts, e.g. floorings, furniture, window frames, wooden fronts, parts of wooden facedes, etc.

SUMMARY OF THE INVENTION

One object of the invention is to provide an impregnating composition based on a solvent-free resin melt which keeps a light color if applied at elevated temperature and pressure. The light color should be largely maintained during a series of loading cycles.

Another object of the invention is to provide wood and wooden pieces impregnated with a resin melt having on the whole a nearly unchanged color after the loading treatment. In particular, an object is to provide light colored wood or wood parts impregnated with a resin melt.

A further object of the invention is to suppress the leaking of the impregnated wood at least up to 85° C. Surfaces of front parts and window frames which are exposed to solar radiation may be heated to 85° C., locally even to 90° C., in particular if they are dark colored, for instance by a dark varnish or a dark colored wood type.

Another object of the invention is to provide a method for impregnating wood with a solvent-free resin melt.

Other objects and advantages of the present invention will become apparent from the following detailed description.

According to the invention wood is impregnated with a solvent-free melt of a modified natural resin, a modified natural resin acid and/or a terpene resin. Besides the modified natural resin and/or modified natural resin acid, melts according to the invention may comprise wax and further additives.

Melts composed of modified natural resins resp. modified natural resin acids according to the invention do not tend to discolor even at the given temperatures of the loading treatment so that the wood treated with a melt according to the invention mainly retains its natural Nuance in color. Because of its resistance against discoloration, the impregnating melt according to the invention may be used for a series of loading cycles and for a prolonged period. Further advantages of modified natural resins and/or modified natural resin acids according to the invention are, firstly, that they do not tend to crystallize from their melt, because crystalline natural resin shows distinct brittleness, and, secondly, have a certain resistance against ultra-violet radiation.

DETAILED DESCRIPTION OF THE INVENTION

Figure 1:
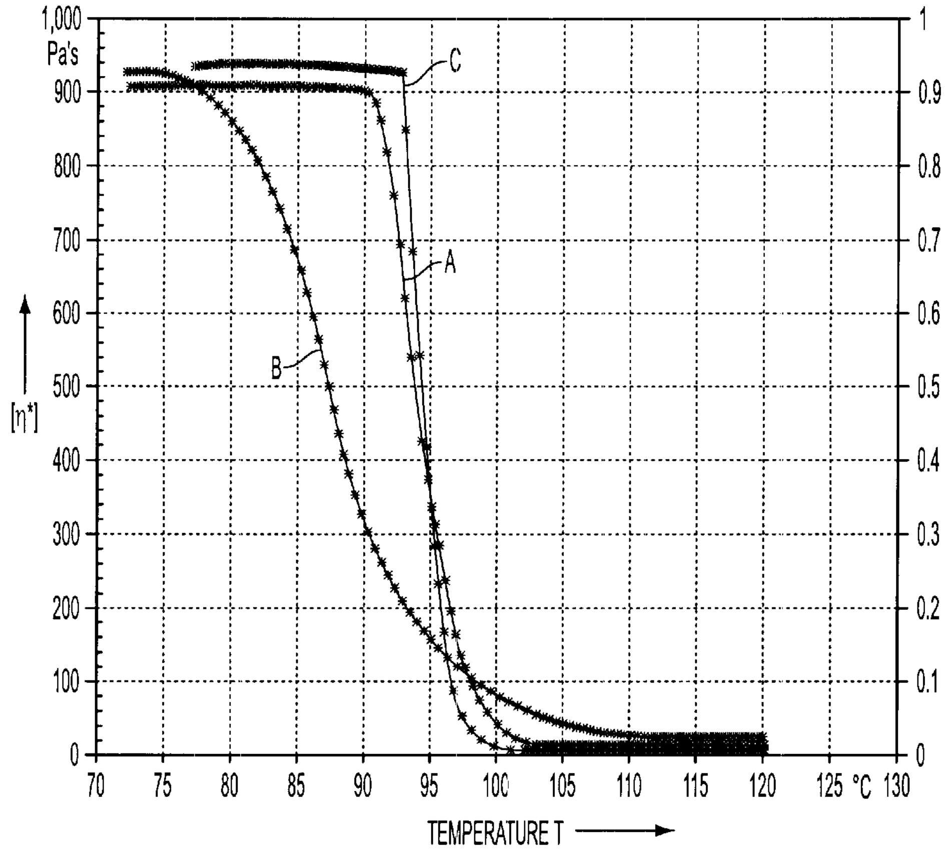
FIG. 1 demonstrates the raising of the softening point together with lowering the viscosity of an impregnating melt according to the invention due to adding paraffin (Paraflint™) to a glycerin resin ester (Dertoline™ SG2) shown as viscosity [η] versus temperature [° C.] curves, whereas curve B shows the nature of Dertoline™ SG2, curve C of Paraflint™ and curve A of a mixture of Paraflint™ and Dertoline™ SG2 in a weight ratio of 1:3.

In the context of the present invention the term "wood" relates to any wooden article or wooden parts, such as boards, beams, panels, veneers, frames, construction elements, and also includes parts made from wood-like fibrous material, such as plywood, laminated wood, woodwool or ligneous fibre.

Examples for "light" colored wood species are maple, pine, birch or beech.

Natural resins and resin acids include all naturally occurring resins, and resin acids which can be derived from plants or animals, e.g. pine trees, and their roots. Natural resins comprise one or more resin acids essentially consisting of specific unsaturated carboxylic acids such as abietic acid, neoabietic acid, levopimaric acid, pimaric acid, isopimaric acid, palustric acid and the like, optionally further containing minor components such as hydrogenated, dehydrogenated or oxidized resin acids, terpenes, terpene alcohols and hydrocarbons. Such natural resins include, for example, dammar, copal, acaroides, rosin, wood resins and tree resins, such as, colophonium, especially, tall resin; but also balsamic resin. Natural resin acids may be isolated by distillation from natural resins. Many of the commercially available natural resins are based on colophonium resins.

Terpene resins, for example polyterpene, such as tri- or tetraterpene, also belong to natural resins in the context of the present invention, as they are derived by polymerization of natural occuring terpene acids, such as α, β-pines, dienes or limonias.

For the purposes of the invention the modified natural resins or terpene resins chosen should be in particular those which are liquid at the loading temperature and preferably do not attack the wood. Substances which have a relatively low viscosity below the temperature at which the wood is attacked are particularly preferred. A person skilled in the art will choose an impregnating melt and any additives such that a solid wood part to be impregnated reaches the desired degree of penetration within an appropriate time depending on its porosity—optionally with the use of vacuum and/or pressure. For the purposes of the invention, “attacked” is to be understood as meaning any undesired change in the properties, in particular discoloration; decomposition by chemical reaction, in particular in the case of extreme changes in the pH; swelling or shrinkage (where undesired); pore formation, etc. It is self-evident that some modified natural resins according to the invention may be suitable for impregnating specific wood types but not for others.

For the purpose of the invention modified natural based resins containing one or more resin acids are suitable which resin acids are modified by a chemical reaction in such a way that their tendency to oxidize, in particular at elevated temperature, are at least reduced, preferably prevented. Further the resins should not be modified to such a degree that the original properties of the natural based resins were altered in such that they largely have taken on the basic particularities of the modifying agent.

To obtain modified natural resins the resin acids of natural resins may be chemically altered or modified according to their respective chemical structure, e.g. the presence of hydroxyl-, phenol-, diene- or dienophilic groups, for example by reactions selected from the group consisting of homogeneous or mixed esterification with monovalent, bivalent or polyvalent alcohols; dimerization; hydration; disproportionation; acrylation, Diels-Alder-reaction; and, optionally, oligomerization and polymerization. Also, mixtures of modified natural resins or resin acids are suitable. Preferably, the chosen modified natural resin is solid at ambient temperature. The softening range of the modified natural resin may be between 20 and 130° C., preferably above 50° C.

Examples for suitable modified natural resins according to the invention are polyterpene, hydrogenated resin, hydrogenated resin acid, esterified resin, esterified resin acid, dimerized resin, dimerized resin acid, oligomerized resin, oligomerized resin acid, resin modified by a Diels-Alder-reaction, resin acid modified by a Diels-Alder-reaction.

In accomplishing another object of the invention, wax or a mixture of waxes is provided as an additive which elevates the softening point of the chemically modified natural resin at least to 85° C., in particular at least to 90° C., optionally above 90° C., as temperatures to about 85° C., sometimes to 90° C., can be measured on dark and thus low reflecting wooden surfaces exposed to solar radiation. The softening temperature of most natural resins and modified natural resins is below 85° C. Thus the resins tend to exude from the laden wood. Such exudations appear as leaking drops on the surface of the wood.

Wax may be added to the melt up to an amount of about 45% (w/w), in particular from 5 to 35% (w/w).

Suitable waxes are, for example, oil waxes, such as paraffin, or natural waxes, such as, Carnauba wax, bees' wax or montan wax. Waxes have the advantageous characteristic of an even sharper viscosity gradient with increasing temperature. In a particular embodiment of the invention wax with a melting point above 80° C., optionally above 85° C., in particular above 90° C. is applied. The combination of wax and resin exhibits good processing properties.

Furthermore the addition of wax to the modified natural resin substantially reduces the viscosity of the resin melt. It is advantageous that the viscosity of the resin melt is also reduced at temperatures from about 100° C., in particular from about 100° C. to about 130° C. During loading a temperature gradient is formed within the wood, wherein the temperature decreases according to the distance to the surface of the wood parts. Consequently, the reduction of the viscosity of the resin melt by the added wax improves the penetration of the melted resin into the wood to the effect that the melted resin penetrates quicker and more deeply into the core of the wood parts. Thus, also the time for loading is then reduced.

Further advantages of loading wood with a mixture of a chemically modified natural resin and wax are:

a substantial increase of the surface hardness, a substantial reduction of swelling and shrinkage, increasing the resistance against pest, and a substantial weathering resistance.

Depending on the dedicated use of the impregnated wood further additives may be added to the impregnating composition:

To counteract the disadvantage of the easy flammability of the wood, flame retardants, such as, for example, ammonium phosphate, zinc borate, organophosphates or organic halogen compounds, are added to the loading melt, it being possible to use glycerol as a solubilizer.

Any suitable coloring agent, such as, for example, dyes, tints, pigments, paints, lacquers, may be employed as staining agents.

Depending on the local area, anti-microbial agents, such as bacteriocides or fungicides, insecticides or even repellents against mammals, such as rodents, may be added to the impregnating composition.

Furthermore, it may be advantageous to employ protectors against ultra violet (UV) radiation for parts which might be exposed to solar radiation.

Although the compositions according to the invention resist sufficiently further oxidation of the resins and, thus, also maintain their color, antioxidants, such as radical scavenger's, compounds having a steric hindrance or amines, may additionally be added to the resin melt, too.

According to a further aspect of the invention, the wood is impregnated by (a) immersing the wood into a melt composed of modified natural resin, subsequently (b) loading the immersed wood with the modified natural resin melt, preferably, under excess pressure and elevated temperature, thereafter relieving the excess pressure, and, finally (c) removing the wood from the melt, the melt still being liquid and cooling down the wood at ambient temperature.

“Loading” is a synonym for the absorption of the impregnating composition by the wood and is—in the context of the present invention—also used for the respective technical impregnating process of immersing, preferably, applying pressure and subsequent relieving of the pressure.

The wood may be immersed in any suitable vessel which can be closed to generate the given excess pressure for the loading.

In a particular embodiment of the invention, the vessel may comprise two chambers. The wood parts may be placed in the first chamber and the resin melt may be warmed up and stored in the second chamber. During the loading the first chamber may be flooded with the melt, which may be recirculated into the second chamber after the treatment, whereupon the next loading cycle may be started after the wood in the first chamber has been replaced by untreated wood.

In another embodiment of the invention the wood may be preheated, at least on its surface before it is immersed into the melt. The wood may be preheated above 60° C., preferably from 60° C. to about 130° C., most preferably from 60° C. to about 100° C. This suppresses a sudden chilling of the resin melt, when the melt is contacting the untreated stacked wood parts during the immersing operation. The preheating of the wood may be carried out, for example, by introducing hot air into the chamber in which the wood is placed.

In a particular embodiment of the invention the melt may be heated up to or above 140° C., in particular from 125° C. to 150° C., for loading. Primary, the temperature to be chosen dependents on the viscosity properties of the used melt (i.e. modified natural resin, optionally in mixture with wax) and can easily be adjusted from case to case.

The applied pressure may be in the range from about 1 to about 25 bar. The upper limit of the applicable pressure mainly depends on the respective crushing strength of the treated material, as collapsing of the wood should be avoided.

In a further embodiment of the invention a vacuum may be applied to support the efficiency of the loading. Applying a vacuum enhances generally the loading efficancy independently from the chosen melt. A vacuum may be applied, for instance, before the wood is immersed into the melt, between steps (a) and (b) before a pressure is applied and/or after the wood has been removed from the melt. The latter promotes to remove excess melt from the wood, whereas, thereafter, the absorbed melt is further drawn into the wood due to the suction being formed when the vacuum is compensated. The applied vacuum may be, for instance, about −0.5 bar.

It seems that the described improvements not only result from the ingredients of the loading material alone (modified natural resin, wax, additives). But also the heating up to 140° C., optionally above 140° C., together with applying pressure may somehow transform the wood structure and thereby improve, among others, the durability against leaking out as well as the effectiveness of penetration. Moreover, the heating reduces swelling, shrinkage and cracking, whereas it increases the resistance against pest.

The use of wood loaded with an impregnating composition according to the present invention is not limited to any specific area of carpentry or timber construction. Due to its superior physical properties it may be used in any places where it is subjected to rough weather, threatened by pests or has to resist high mechanical stress.

Due to the temperature stability of resin melts according to the present invention, the present invention is particularly advantageous for the impregnation of wood parts, particularly made from light wood, which are designated to be placed visibly and should retain their natural appearance to the widest possible extent. It is self-evident that the present invention is also suitable for dark wood species or dark colored wood.

In order that the invention described herein may be more fully understood, the following examples are set forth. The examples are for illustrative purpose and are not construed as limiting the invention in any respect.

EXAMPLE 1

A modified natural resin based on an ester of abietic acid and glycerol (Dertoline™ SG2 manufactured by DRT/Les Dérivés Résiniques & Terpéniques, France, softening point from 76 to 84° C.) is melted in an open vessel and brought to a temperature of 140° C. Wood parts (beech), 400 mm long, 80 mm wide, 20 mm thick and having a residual moisture of approximately 10% (w/w) are immersed into this hot resin melt and are kept below the liquid level. The vessel is then closed and a gas pressure of 6 bar is applied. After this pressure has been applied for 40 minutes, it is slowly relieved within 3 minutes, after which the laden parts of wood are removed from the resin melt and cooled down at ambient temperature.

This resin melt was used for 20 loading cycles within two days; previously untreated wood was provided for each cycle. After 5 loading cycles the color of the resin melt discolored slightly into light brown. The alteration of the color resulted from extracted substances contained in the wood. Further darkening of the resin melt was prevented by adequately supplementing with fresh resin melt.

EXAMPLE 2

400 mm long, 80 mm wide and 20 mm thick wood boards of beech or pine were introduced in a 60 liter vessel filled with a melt of a mixture of 2 parts per weight of a modified natural resin based on an abietic acid/glycerol ester (Dertoline SG2™) and 1 part per weight paraffin (Paraflint H1™ provided by HDS-Chemie) kept at 140° C. The vessel was closed and a gas pressure of 6 bar had been applied for 40 minutes. After that the pressure was relieved, the laden wood boards were removed from the melt and any remaining melt was eliminated from the surface of the boards. Thereafter the laden wood boards were stored at ambient temperature for 24 hours. The weight of the wood increased by about 25% on the average as a result of the treatment and the color of the laden wood retained nearly unchanged compared to that of the untreated wood.

Figure 2:
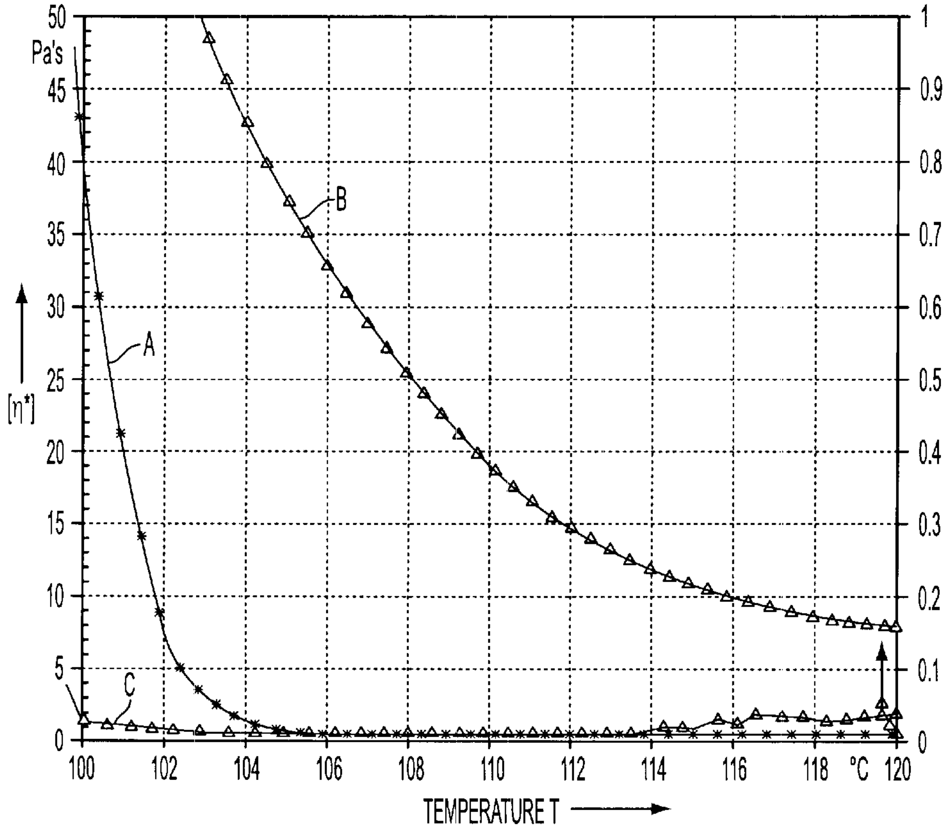
FIG. 2 is a detailed graphic representation of the diagram of FIG. 1 in the temperature range from 100 to 120° C.

The viscosity properties of the above loading composition (2 parts per Dertoline SG2™ and 1 part per weight Paraflint H1™ are shown in FIGS. 1 and 2).

Subsequently, the wood boards were subjected to gradually increasing temperature levels of 70, 75, 80, 85, 90 and 95° C. visually rating the wood at each temperature level. Up to 90° C. no alterations were observed on the wood surface. At 95° C. small droplets leaking out could be detected after some time.

Pine boards treated according to the invention were superior to non treated pine concerning:

- the increase of surface hardness by more than 50%,
- the reduction of swelling and shrinkage by more than 60%,
- the increase of the resistance against pest, and
- the reduction of cracking caused by weather. In particular the number of cracks was reduced and larger cracks did not appear any longer.

EXAMPLE 3

Balsamic resin (not modified and not distilled natural resin), tall resin (Sacotan 85™, distilled and not modified tall resin manufactured by Krems Chemie, Austria), a modified natural resin based on a stabilized ester of glycerol resin (Dertoline™ SG2 manufactured by DRT/Les Dérivés Résiniques & Terpéniques, France, softening temperature 80 to 90° C.), a by disproportionation modified natural resin enriched with a dehydrogenated abietic acid (Gresinox™ 578 M manufactured by Granel S.A., France, softening point from 76 to 84° C.) and a by hydrogenation modified natural resin (Hydrogral™ manufactured by Granel S.A., France, softening point from 74 to 84° C.) were each filled into a tray (100×100 mm) in a layer of 15 mm thickness and were subjected to 145° C. for 120 hours in a hot-air box. After that the resins in the trays were visually rated.

The unmodified natural resins Sacotan™ 85 and balsamic resin were discolored from dark brown to black. All modified natural resins (Dertoline™ SG2, Gresinox™ 578 M and Hydrogral™) nearly retained their light color.

EXAMPLE 4

110 mm long, 70 mm wide and 7 mm thick pine boards were loaded as described in Example 2. The weight of the wood was increased by about 25% on the average after loading. These boards were tested for their resistance against termites by the EN 118 procedure. The tests—conducted at the CTBA in Bordeaux, France—demonstrated that wood treated as described in Example 2 is resistant against termites according to EN 118.

EXAMPLE 5

110 mm long, 70 mm wide and 7 mm thick pine boards were loaded in a melt of 130° C. at 3 bar for 30 minutes in a 2 liter vessel. The loading mixtures were based on 5 different resins (Sacotan™ 85, balsamic resin, polyterpene (Dertolyte™ M115), Sylvaeres™ TR 1085 and Dertoline™ SG 2) alternatively containing paraffin (Paraflint™ H1) in an amount of 0, 10 or 30% (w/w). The amount of loaded melt in % (w/w) absorbed during this treatment is shown in Table 1.

TABLE 1

| Paraflint ™ H1 in % (w/w) | Sacotan ™ 85 | Balsamic resin | Dertolyte ™ M115 | Sylvaeres ™ 1085 | Dertoline ™ SG2 |
|---|---|---|---|---|---|
| 0 | 35 | 53 | 5 | 21 | 16.5 |
| 10 | 50 | 43 | 16 | 34 | 36 |
| 30 | 51 | 54 | 50 | 51 | 39 |

The addition of wax increased the absorption of loading melt with polyterpene and modified natural resins.

EXAMPLE 6

Comparative Example to Example 1

Beech wood was treated with a tall resin melt (Sacotan™) under the loading conditions as described in Example 1.

After the first loading cycle no considerable alteration of the color of the resin melt could be detected. After each loading cycle the amount of absorbed resin was refilled with fresh resin melt. The ratio between fresh resin melt and already used resin melt was about 1:10. Thus the resin was completely replaced after 10 loading cycles, whereas already used resin remains always in the melt at any time from the first loading. Already after 10 loading cycles the resin melt discolored into brown and the color of the obtained laden wood became darker and darker. After two days and 20 loading cycles the melt became unsuitable for loading of light tinted wood and had to be disposed, although the resin was renewed twice calculated on the replacement with fresh resin melt. The resin melt discolored into dark because of the autocatalytic oxidation of the unmodified tall resin melt.

EXAMPLE 7

Comparative Example to Example 2

Beech and pine boards (400×80×20 mm) were introduced into a melt (140° C.) of a mixture of 1 part per weight montan wax (Iscoblend™ 207 manufactured by Schlickum) and 2 parts per weight tall resin (Sacotan™ 85), and subjected to the loading conditions and to the gradually increased temperature levels as described in example 2. At 75° C., droplets of the loading mixture emerged from the wood. At 85° C. the loading mixture started leaking out of the wood.

What we claim is:

1. A process of impregnating wood, comprising the step of immersing wood parts into a solvent-free melt of at least one component selected from the group consisting of chemically modified natural resin, chemically modified natural resin acid and terpene resin, wherein said component is solid at ambient temperature.

2. The process as claimed in claim 1, wherein the chemical modification of said chemically modified natural resin or chemically modified natural resin acid reduces the tendency to oxidize of said resin or resin acid.

3. The process as claimed in claim 1, wherein the chemical modification is selected from the group consisting of esterification, dimerization, hydrogenation, disproportionation, acrylation, Diels-Alder-reaction, oligomerization and polymerization.

4. The process as claimed in claim 3, in which said component is selected from the group consisting of polyterpene, hydrogenated resin, hydrogenated resin acid, esterified resin, esterified resin acid, dimerized resin, dimerized resin acid, oligomerized resin, oligomerized resin acid, resin modified by a Diels-Alder-reaction, resin acid modified by a Diels-Alder-reaction.

5. The process as claimed in claim 1, wherein said melt further comprises wax in an amount of greater than 0% and up to 45% (w/w).

6. The process as claimed in claim 5, wherein the wax has a melting point above 80° C.

7. The process as claimed in claim 5, wherein the melt comprises wax in an amount of 5 to 35% (w/w).

8. The process as claimed in claim 1, wherein the melt further comprises at least one substance selected from the group consisting of flame retardants, staining agents, antioxidants, anti-microbial agents, insecticides, repellents and UV-protectors.

9. The process as claimed in claim 1, comprising the steps:

(i) immersing wood parts into said solvent-free melt;

(ii) loading the immersed wood parts with said melt under excess pressure and elevated temperature, thereafter relieving the excess pressure; and (iii) removing the wood parts from the melt.

10. The process as claimed in claim 9, wherein the melt is heated to about 140° C. in steps (i) and (ii) and a pressure of about 6 bar is applied in step (ii).

11. The process as claimed in claim 9, further comprising the step of preheating the wood parts above 60° C. before step (i).

12. The process as claimed in claim 9, wherein a vacuum is applied during step (i).

13. The process as claimed in claim 9, wherein a vacuum is applied after step (iii).

14. Wood parts impregnated with a solvent-free melt of at least one component selected from the group consisting of chemically modified natural resin, chemically modified natural resin acid, wherein the tendency to oxidize of said natural resin or natural resin acid is reduced by a chemical modification of said natural resin or natural resin acid; and terpene resin, wherein said component is solid at ambient temperature.

15. Wood parts as claimed in claim 14, wherein the component is selected from the group consisting of polyterpene, hydrogenated resin, hydrogenated resin acid, esterified resin, esterified resin acid, dimerized resin, dimerized resin acid, oligomerized resin, oligomerized resin acid, resin modified by a Diels-Alder-reaction, resin acid modified by a Diels-Alder-reaction.

16. Wood parts as claimed in claim 14, wherein the melt further comprises wax in an amount greater than 0% and up to 45% (w/w).

17. Wood parts according to claim 14, wherein the parts are selected from the group consisting of boards, beams, panels, veneers, frames, construction elements, plywood panels and laminates.

* * * * *